US012662415B2

(12) United States Patent
Fukuchi et al.

(10) Patent No.: US 12,662,415 B2
(45) Date of Patent: Jun. 23, 2026

(54) GLASS FILLER AND METHOD FOR PRODUCING THE SAME, AND RESIN-CONTAINING COMPOSITION INCLUDING GLASS FILLER

(71) Applicant: Nippon Sheet Glass Company, Limited, Tokyo (JP)

(72) Inventors: Hidetoshi Fukuchi, Mie (JP); Tomohiro Yagyu, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1109 days.

(21) Appl. No.: 17/642,099

(22) PCT Filed: Sep. 10, 2020

(86) PCT No.: PCT/JP2020/034344

§ 371 (c)(1),
(2) Date: Sep. 8, 2022

(87) PCT Pub. No.: WO2021/049581

PCT Pub. Date: Mar. 18, 2021

(65) Prior Publication Data

US 2023/0024895 A1      Jan. 26, 2023

(30) Foreign Application Priority Data

Sep. 10, 2019    (JP) ................................. 2019-164411

(51) Int. Cl.
C03C 3/093 (2006.01)
C03C 3/087 (2006.01)
C08K 3/40 (2006.01)

(52) U.S. Cl.
CPC .............. C03C 3/093 (2013.01); C03C 3/087 (2013.01); C08K 3/40 (2013.01)

(58) Field of Classification Search
CPC .................................. C03C 3/06; C03C 12/00
See application file for complete search history.

(56) References Cited

U.S. PATENT DOCUMENTS 4,336,048 A      6/1982   van der Steen et al.
6,468,932 B1    10/2002   Robin et al.
(Continued)

FOREIGN PATENT DOCUMENTS

FR           2610318 A1      8/1988
JP       H05178642 A         7/1993
(Continued)

OTHER PUBLICATIONS

JP-2016216320-A English language text (Year: 2016).*
(Continued)

*Primary Examiner* — Benjamin L Utech
(74) *Attorney, Agent, or Firm* — HSML P.C.

(57) ABSTRACT

Provided is a novel glass filler having a low permittivity. The glass filler provided includes a glass composition, wherein the glass composition includes, in wt %: $95 \leq SiO_2 \leq 99.5$; $0 \leq B_2O_3 \leq 2$; $0.01 \leq Al_2O_3 \leq 4$; $0 \leq R_2O \leq 4$; $0.01 \leq RO \leq 4$; and $0 \leq TiO_2 \leq 4$, where RO is at least one selected from MgO, CaO, SrO, and ZnO, and $R_2O$ is at least one selected from $Li_2O$, $Na_2O$, and $K_2O$. This glass filler can have a permittivity of less than 4 at 1 GHz.

18 Claims, 4 Drawing Sheets

(56)      References Cited

U.S. PATENT DOCUMENTS

| | | | |
|---|---|---|---|
| 2009/0088515 | A1 | 4/2009 | Yagyu et al. |
| 2018/0094123 | A1* | 4/2018 | Meyerhoff ........... C08K 11/005 |
| 2018/0134611 | A1 | 5/2018 | Sakata |
| 2018/0263861 | A1* | 9/2018 | Bringley ............... C09C 1/3018 |

FOREIGN PATENT DOCUMENTS

| | | | |
|---|---|---|---|
| JP | H07172876 | | 7/1995 |
| JP | H09286633 | | 11/1997 |
| JP | 2003034728 | | 2/2003 |
| JP | 2007515450 | | 6/2007 |
| JP | 2013159546 | | 8/2013 |
| JP | 2014108897 | | 6/2014 |
| JP | 2016216320 | A  * | 12/2016 |
| WO | 9851631 | A1 | 11/1998 |
| WO | 2005060921 | | 7/2005 |
| WO | 2007111221 | | 10/2007 |
| WO | 2017010189 | | 1/2017 |

OTHER PUBLICATIONS

Extended European Search Report issued for European Patent Application No. 20863052.5, dated Nov. 7, 2023, 6 pages.
International Search Report and Written Opinion issued for International Patent Application No. PCT/JP2020/034344, Date of mailing: Nov. 17, 2020, 9 pages including English translation of Search Report.
Communication pursuant to Article 94(3) EPC issued for European Patent Application No. 20863052.5, dated Dec. 1, 2025, 6 pages.

* cited by examiner

GLASS FILLER AND METHOD FOR PRODUCING THE SAME, AND RESIN-CONTAINING COMPOSITION INCLUDING GLASS FILLER

TECHNICAL FIELD

The present invention relates to a glass filler. The present invention further relates to a method for producing a glass filler and a resin-containing composition including a glass filler.

BACKGROUND ART

A glass epoxy board, which is a type of printed boards, is produced by impregnating a glass cloth formed of continuous glass fibers with a resin composition. To meet the demand for reducing the size of electronic devices and the demand for reducing the thickness of the electronic devices to achieve a high performance, a glass cloth is required to have a low permittivity.

Patent Literature 1 discloses that a glass cloth formed of continuous E-glass fibers is leached to increase the $SiO_2$ content, thereby decreasing the permittivity of the glass cloth. The leaching is performed using an acidic solution. After the leaching, the glass cloth is washed with water and is heat-treated at 700 to 800° C. According to examples of Patent Literature 1, the permittivity of the glass cloth at a frequency of 1 MHz is decreased by the leaching to about 4.4 to 4.5.

Decrease in permittivity of a glass cloth can be achieved also by improving a glass composition. For example, E-glass has a permittivity of about 6.6 at a frequency of 1 MHz, whereas an improved glass composition called D-glass has a permittivity of about 4.0 to 4.1 at a frequency of 1 MHz. The permittivity of the D-glass is about 4.1 to 4.2 even at a frequency of 10 GHz and is sufficiently low even in a high frequency band.

Because of requiring, in addition to a treatment with an acidic solution, a water washing treatment and a heating treatment as subsequent steps, decrease in permittivity by leaching is complicated and causes an increase in production costs. Also for this reason, it is relatively advantageous to decrease the permittivity of the glass cloth by adjusting the glass composition. Under the circumstances, a glass composition for continuous glass fibers having a low permittivity has been proposed in addition to D-glass.

Note that leaching is also used to improve the heat resistance of continuous glass fibers. Patent Literature 2 discloses that a surface portion having a $SiO_2$ content increased by leaching a continuous E-glass fiber is formed. In examples of Patent Literature 2, the $SiO_2$ content in the surface portion of the continuous E-glass fiber having a fiber diameter of 9 μm is increased to 90.0 to 93.9 wt %. However, in the examples, the $SiO_2$ content in the entire fiber including the inside is 55.1 to 65.8 wt %. The leaching in Patent Literature 2 is performed such that the $SiO_2$ content in the entire fiber including the inside does not exceed 80 wt % (Claim 2). According to Patent Literature 2, the reason why the $SiO_2$ content is limited is that when the entire continuous glass fiber becomes siliceous, the continuous glass fiber decreases in strength thus to become brittle or decreases in chemical durability.

CITATION LIST

Patent Literature

Patent Literature 1: JP 2003-34728 A
Patent Literature 2: JP H7-172876 A

SUMMARY OF INVENTION

Technical Problem

A resin-containing composition for use in printed boards contains an inorganic filler together with a resin, and further contains a curing agent, a modifying agent, or the like as necessary. As the inorganic filler, a ceramic filler, a glass filler, or the like is used. However, a sufficient study has not been made so far on the decrease in permittivity of a glass filler, unlike that of a glass cloth or a continuous glass fiber for constituting the glass cloth. In view of the above, the present invention aims to provide a novel glass filler having a low permittivity.

Solution to Problem

The present invention provides a glass filler including a glass composition, wherein
the glass composition includes, in wt %:
95 $SiO_2 \leq 99.5$;
$0 \leq B_2O_3 \leq 2$;
$0.01 \leq Al_2O_3 \leq 4$;
$0 \leq R_2O \leq 4$;
$0.01 \leq RO \leq 4$; and
$0 \leq TiO_2 \leq 4$,
where RO is at least one selected from MgO, CaO, SrO, and ZnO, and $R_2O$ is at least one selected from $Li_2O$, $Na_2O$, and $K_2O$.
In another aspect, the present invention provides a resin-containing composition including:
the glass filler according to the present invention; and
a resin.
In yet another aspect, the present invention provides a method for producing the above glass filler according to the present invention, the method including:
a step of producing a glass filler precursor including a base glass composition; and
a step of eluting at least partially the base glass composition from the glass filler precursor such that a glass filler including a glass composition differing in composition from the base glass composition is obtained.

Advantageous Effects of Invention

According to the present invention, it is possible to provide a novel glass filler having a low permittivity. The glass filler according to the present invention is suitable for improvement in various properties of a resin-containing composition by incorporation of a glass filler while decreasing the permittivity of the resin-containing composition. This improvement includes, for example, improvement in strength, heat resistance, and dimensional stability, decrease in linear thermal expansion coefficient and reduction in its anisotropy, and reduction in anisotropy of the shrinkage factor at molding. Further, according to the method of the present invention, it is possible to efficiently produce a novel glass filler having a low permittivity.

DESCRIPTION OF EMBODIMENTS

Figure 1A:
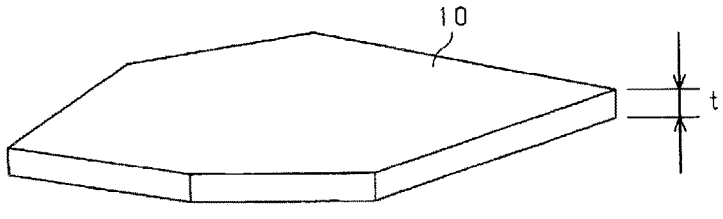
FIG. 1A is a perspective view showing an example of a glass flake.

Hereinafter, the symbol "%" indicating the content of each component means "wt %" in every case. The phrase "substantially free of" means that the content is less than 0.1 wt %, preferably less than 0.07 wt %, more preferably less than 0.05 wt %, and particularly preferably less than 0.02 wt %. The content, properties, and other preferred ranges of each component can be understood by arbitrarily combining the upper and lower limits individually described below. Also, permittivity refers to relative permittivity (dielectric constant) in a strict sense. In the present specification, relative permittivity is expressed simply as permittivity, as is conventional. Values of permittivity, or relative permittivity, are those determined at room temperature ($25°$ C.). The following description is not intended to limit the present invention, and is provided in the sense of indicating preferred embodiments thereof.

The study by the present inventors has found that a glass filler having a sufficiently low permittivity can be provided. The permittivity of this glass filler can have a value lower than that of D-glass. A glass filler having a sufficiently low permittivity can be produced, for example, by leaching. Unlike a continuous glass fiber in which importance is attached to the strength as a constituent material of a glass cloth, a glass filler does not lose the practicality even after leaching is sufficiently advanced. Application of leaching allows, for example, to change the composition such that a decrease in contents of $TiO_2$ and $Al_2O_3$ is smaller than that of $R_2O$ and RO, while preferentially removing $R_2O$ and RO to greatly decrease the contents of these components. Such a composition change is desirable to decrease the permittivity. To sufficiently decrease the permittivity, it is preferable to decrease the content of $R_2O$ to an extent that the composition is substantially free of $R_2O$.

[Components of Glass Composition]

($SiO_2$)

$SiO_2$ is a component forming the network structure of glass. $SiO_2$ acts to decrease the permittivity of a glass composition. The $SiO_2$ content is preferably 95% or more, 96% or more, 97% or more, more preferably 97.5% or more, and particularly preferably 98% or more. On the other hand, to efficiently produce the glass filler, the glass composition preferably contains a component other than $SiO_2$. The $SiO_2$ content is preferably 99.5% or less, more preferably 99% or less, and may be, in some cases, 98.7% or less, or particularly 98.5% or less.

($B_2O_3$)

$B_2O_3$ is a component forming the network structure of glass as well. Further, $B_2O_3$ is also a component that has an effect of decreasing the permittivity of the glass composition. However, a composition excessively containing $B_2O_3$ tends to have a poor acid resistance. Accordingly, the $B_2O_3$ content may be 0.01% or more, 0.05%, or even 0.1% or more. The $B_2O_3$ content may be 2% or less, 1% or less, even 0.5% or less, or particularly 0.3% or less. $B_2O_3$ is an optional component, and the glass composition may be substantially free of $B_2O_3$.

($Al_2O_3$)

$Al_2O_3$ is known to act to improve the chemical durability of the glass composition. The $Al_2O_3$ content may be 0.01% or more, 0.05% or more, 0.1% or more, 0.2% or more, or even 0.3% or more. Although $Al_2O_3$ acts slightly to increase the permittivity, an excessively high $Al_2O_3$ content cannot achieve a sufficiently low permittivity. The $Al_2O_3$ content may be 4% or less, 2% or less, 1.5% or less, 1% or less, even 0.8% or less, or particularly 0.6% or less, and may be, in some cases, 0.5% or less, or even 0.3% or less.

($SiO_2+B_2O_3+Al_2O_3$)

To allow additional components, the total of the $SiO_2$, $B_2O_3$, and $Al_2O_3$ contents may be 99.8% or less, or 99.6% or less, and may be 99.5% or less in some cases.

($R_2O$)

$R_2O$ is a component modifying the network structure of glass. The effect of the network modification is to decrease the viscosity of the glass composition. In the glass composition of the filler of the present invention, the network modification has an effect of facilitating to obtain a filler having a smoother surface in a heat treatment step after an eluting step. However, a composition excessively containing $R_2O$ tends to have a poor acid resistance. Accordingly, the $R_2O$ content, that is, the total of the $Li_2O$, $Na_2O$, and $K_2O$ contents may be 0.01% or more, 0.05% or more, or even 0.1% or more. The $R_2O$ content may be 2% or less, 1% or less, 0.5% or less, or even 0.3% or less. $R_2O$ is an optional component and the glass composition may be substantially free of $R_2O$. The glass composition may also be substantially free of each of $Li_2O$, $Na_2O$ and $K_2O$. The $Li_2O$, $Na_2O$, and $K_2O$ contents each can be individually adjusted within the upper and lower limits exemplified as the $R_2O$ content.

Preferred $Li_2O$, $Na_2O$, and $K_2O$ contents are exemplified below (the symbol % after the numerical values is omitted; hereinafter the same applies to the numerical values in this form):

$0 \leq Li_2O \leq 1$;

$0 \leq Na_2O \leq 2$; and $0 \leq K_2O \leq 2$.

(RO)

RO is also a component improving the chemical durability in the present embodiment. The RO content, that is, the total of the MgO, CaO, SrO, and ZnO contents may be 0.01% or more, 0.05% or more, 0.1% or more, 0.2% or more, even 0.3% or more, or particularly 0.4% or more. An excessively high RO content cannot achieve a sufficiently low permittivity. The RO content may be 4% or less, 2% or less, 1.7% or less, 1.5% or less, even 1% or less, or particularly 0.8% or less, and may be 0.5% or less in some cases. The MgO, CaO, SrO, and ZnO contents each can be individually adjusted within the range of the upper and lower limits exemplified as the RO content.

RO decreases the devitrification temperature, but does not increase the permittivity as much as alkali metal oxide $R_2O$. Accordingly, it is preferable that the RO content should be higher than the $R_2O$ content. However, SrO increases the permittivity compared with MgO, CaO, and ZnO. It is preferable that the glass composition should be substantially free of SrO. The glass composition may be substantially free of ZnO as well. MgO acts slightly to increase the permittivity compared with CaO. On the other hand, CaO acts significantly to decrease the viscosity of the glass composition at melting compared with MgO. The proportions of these two components can be appropriately adjusted according to required properties and the like. For example, in the case where the $SiO_2$ content is increased sufficiently to increase the permittivity, the ratio of the CaO content to the MgO content (CaO/MgO) may be two or more, three or more, or even four or more. Note that MgO and CaO are individually optional components like SrO and ZnO. The glass composition may be substantially free of each of MgO and CaO.

Preferred MgO, CaO, SrO, and ZnO contents are exemplified below:

$0 \leq MgO \leq 2$;
$0 \leq CaO \leq 2$;
$0 \leq SrO \ 1$; and
$0 \leq ZnO \leq 2$.

Particularly preferred MgO and CaO contents are exemplified below:

$0.05 \leq MgO \leq 0.5$; and
$0.1 \leq CaO \leq 1$.

($TiO_2$)

$TiO_2$ is a component having an effect of remarkably improving the alkali resistance even when added in a small amount. In containing the filler of the present invention in a resin-containing composition, this effect contributes to improvement in durability of the resin against, for example, an alkali component such as a curing catalyst. However, a composition excessively containing $TiO_2$ tends to have an excessively high permittivity. By substituting $SiO_2$ with a minute amount of $TiO_2$, it is possible to decrease the viscosity of the glass composition while preventing the permittivity from decreasing. The $TiO_2$ content may be 0.01% or more, 0.05% or more, 0.1% or more, 0.2% or more, or even 0.25% or more, and may be or 0.3% or more in some cases. The $TiO_2$ content may be 4% or less, 2% or less, 1.5% or less, 1% or less, even 0.8% or less, or particularly 0.6% or less, and may be 0.5% or less in some cases. $TiO_2$ is an optional component and the glass composition may be substantially free of $TiO_2$.

($T\text{-}Fe_2O_3$)

$T\text{-}Fe_2O_3$ is a component coloring the glass composition. In the case where the glass filler may be colored, the glass composition preferably contains $T\text{-}Fe_2O_3$. Meanwhile, in the case where the glass filler is required to be colorless, the $T\text{-}Fe_2O_3$ content may be 0.01% or more, 0.02% or more, or even 0.05% or more. The $T\text{-}Fe_2O_3$ content may be 0.5 or less, 0.3% or less, or even 0.2% or less. $T\text{-}Fe_2O_3$ is an optional component and the glass composition may be substantially free of $T\text{-}Fe_2O_3$. Although $T\text{-}Fe_2O_3$ is sometimes inevitably introduced into the glass composition by derivation from a glass raw material, a glass composition substantially free of $T\text{-}Fe_2O_3$ can be obtained by an acid treatment described later.

Herein, total iron oxide calculated as $Fe_2O_3$ is expressed as $T\text{-}Fe_2O_3$, as is conventional. Accordingly, at least a portion of $T\text{-}Fe_2O_3$ may be contained as FeO.

(Additional Components)

Example of components that can be contained in the glass composition, in addition to the above components, include $P_2O_5$, BaO, PbO, $ZrO_2$, $La_2O_3$, $Y_2O_3$, $MoO_3$, $WO_3$, $Nb_2O_5$, $Cr_2O_3$, $SnO_2$, $CeO_2$, $As_2O_3$, $Sb_2O_3$, and $SO_3$. Other components that can be contained in the glass composition include, for example, noble metal elements such as Pt, Rh, and Os, and, for example, halogen elements such as F and Cl. The allowable content of each of these components is preferably less than 1%, and particularly preferably less than 0.5%, and the total content of the components is preferably less than 4%, more preferably less than 3%, particularly preferably less than 2%, and more particularly preferably less than 1%. However, the glass composition may be substantially free of each of the above additional components. Although a minute amount of $ZrO_2$ is sometimes added to a low-permittivity glass, the glass composition may be substantially free of $ZrO_2$ in the present embodiment. It is preferable that the glass composition should be substantially free of BaO and PbO. It is preferable that the glass composition should be substantially free of $P_2O_5$ as well. This is because BaO and PbO have a great effect of increasing the permittivity of the glass composition, and $P_2O_5$ induces phase separation.

[Preferred Composition Example of Glass Composition]

A preferred composition example is shown below. The glass composition may be substantially free of components other than the following components:

$95 \leq SiO_2 \leq 99$;
$0 \leq B_2O_3 \leq 2$;
$0.01 \leq Al_2O_3 \leq 2$;
$0 \leq R_2O \leq 2$;
$0.01 \leq RO \leq 2$; and
$0 \leq TiO_2 \leq 2$.

[Properties of Glass Filler]

(Permittivity)

In a preferred embodiment, the permittivity of the glass filler at a frequency of 1 GHz is less than 4, 3.97 or less, 3.95 or less, 3.93 or less, or even 3.9 or less, and is 3.85 or less in some cases.

(Dielectric Loss Tangent)

In a preferred embodiment, the dielectric loss tangent of the glass composition according to the present invention at a frequency of 1 GHz is 0.0008 or less, 0.0007 or less, or even 0.0006 or less.

(Surface Roughness)

The surface roughness Ra of the glass filler is, for example, preferably 0 to 100 nm, and particularly preferably 1 to 50 nm. The surface roughness Ra is described in Japanese Industrial Standards (JIS) B 0601-2001. According to the study by the present inventors, the surface roughness Ra of the glass filler is sometimes increased by the eluting step described later, and Ra is preferably adjusted by a heating step following the eluting step to an extent that reaches the above range.

(Specific Surface Area)

The specific surface area of the glass filler is, for example, preferably 0.03 to 10 $m^2$/g, particularly preferably 0.05 to 2 $m^2$/g, and more preferably 0.1 to 1.5 $m^2$/g. The specific surface area can be measured, for example, by the BET method (nitrogen adsorption method).

(Pore Volume)

The pore volume of the glass filler is, for example, preferably 0 to 0.1 $cm^3$/g, particularly preferably 0.0005 to 0.05 $cm^3$/g, and more preferably 0.001 to 0.015 $cm^3$/g.

The pore volume can also be measured, for example, by the BET method (nitrogen adsorption method). Here, the term "pore volume" means the total pore volume determined by the BET method.

[Glass Filler]

(Form of Glass Filler)

The form of the glass filler is not particularly limited, and may fall under at least one selected from, for example, a glass flake, a chopped strand, a milled fiber, a glass powder, a glass bead, a flat fiber, and a flaky glass. Note that these forms are not strictly distinguished from each other. Further, two or more types of glass fillers having different forms may be used in combination as a filler. Note that the glass filler may have a fibrous shape, or may have other shape. In the case where the glass filler has a fibrous shape, the glass filler has a fiber length of preferably 30 mm or less, 10 mm or less, more preferably 5 mm or less, and particularly preferably less than 3 mm. However, the glass filler may be longer. Each of the forms will be described below.

Figure 1B:
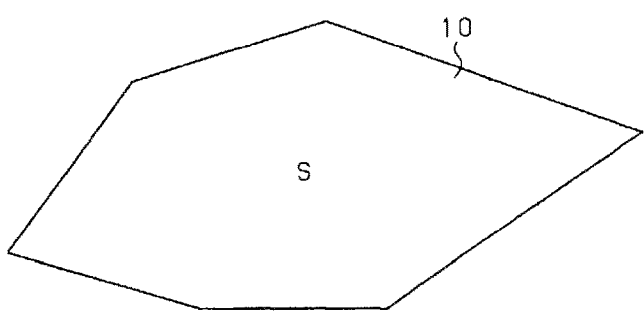
FIG. 1B is a plan view of the glass flake shown in FIG. 1A.

A glass flake is called also a scaly glass, and has a flake-like shape. The average thickness of the glass flake is, for example, 0.1 to 15 μm. As shown in FIG. 1A, the thickness of the glass flake corresponds to a distance t between both principal surfaces of a glass flake 10. FIG. 1B shows the principal surface of the glass flake 10 having an area S. The average particle diameter is, for example, 0.2 to 15000 μm. The aspect ratio of the glass flake is, for example, 2 to 1000. The aspect ratio can be determined by dividing the average particle diameter by the average thickness. The average thickness can be determined by measuring the thickness t of 100 or more sheets of glass flakes with a scanning electron microscope (SEM) and calculating its average value. The average particle diameter of the glass flakes can be determined by a particle diameter (D50) at a cumulative volume percentage of 50% in particle size distribution measured by a laser diffraction scattering method.

Figure 2:
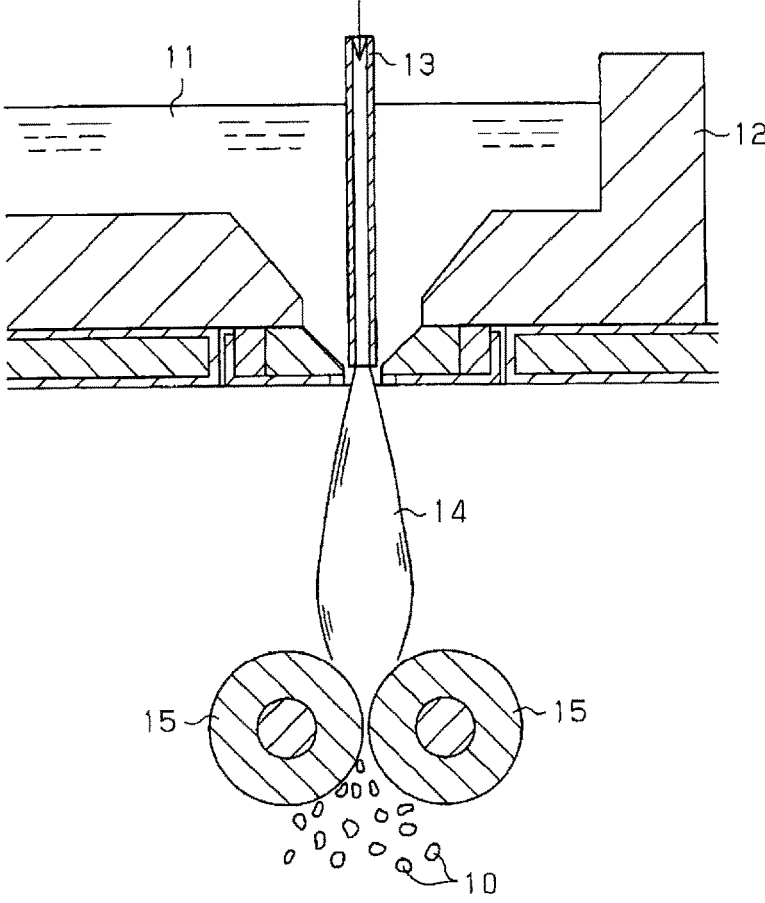
FIG. 2 is a cross-sectional view showing an example of an apparatus for producing glass flakes.

The glass flake can be obtained by a known blow process, cup process, or the like. FIG. 2 shows a producing apparatus using the blow process. In this apparatus, a raw glass 11 having a predetermined composition molten in a refractory furnace 12 is inflated into a balloon by a gas delivered through a blow nozzle 13, and thus a hollow glass film 14 is obtained. This hollow glass film 14 is crushed by a pair of pressing rolls 15, and thus the glass flakes 10 are obtained.

A chopped strand has a shape obtained by cutting a glass fiber into short pieces. The chopped strand has a fiber diameter of, for example, 1 to 50 μm, and has an aspect ratio of, for example, 2 to 1000. The aspect ratio of the chopped strand can be determined by dividing the fiber length by the fiber diameter. The chopped strand can be produced, for example, using the apparatuses shown in FIGS. 3 and 4.

Figure 3:
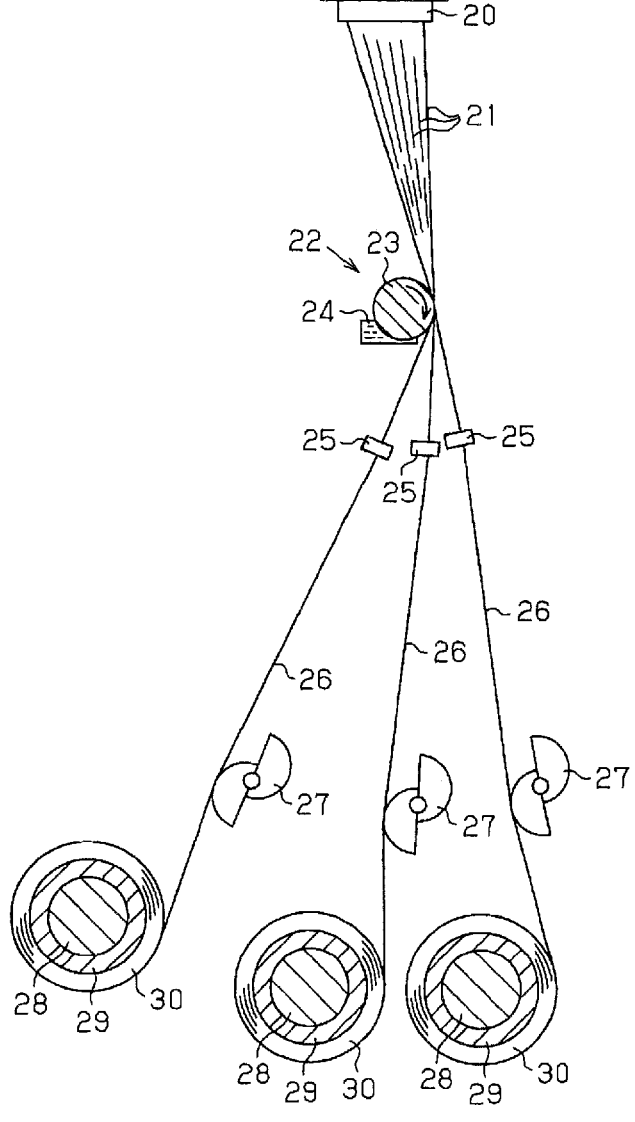
FIG. 3 is a cross-sectional view partially showing an example of an apparatus for producing chopped strands.

As shown in FIG. 3, a raw glass having a predetermined composition molten in a refractory furnace is drawn through a bushing 20 having a large number of (for example, 2400) nozzles in the bottom, and drawn out as a large number of glass filaments 21. The glass filaments 21 are sprayed with cooling water, and then a binder (sizing agent) 24 is applied to the glass filaments 21 by an application roller 23 of a binder applicator 22. The large number of glass filaments 21, to which the binder 24 is applied, are bundled, through reinforcing pads 25, into three strands 26 each composed of, for example, about 800 glass filaments 21. While being traversed by a traverse finger 27, each of the strands 26 is wound on a cylindrical tube 29 mounted on a collet 28. The cylindrical tube 29, on which the strand 26 is wound, is detached from the collet 28, and thus a cake (wound strand body) 30 is obtained.

Figure 4:
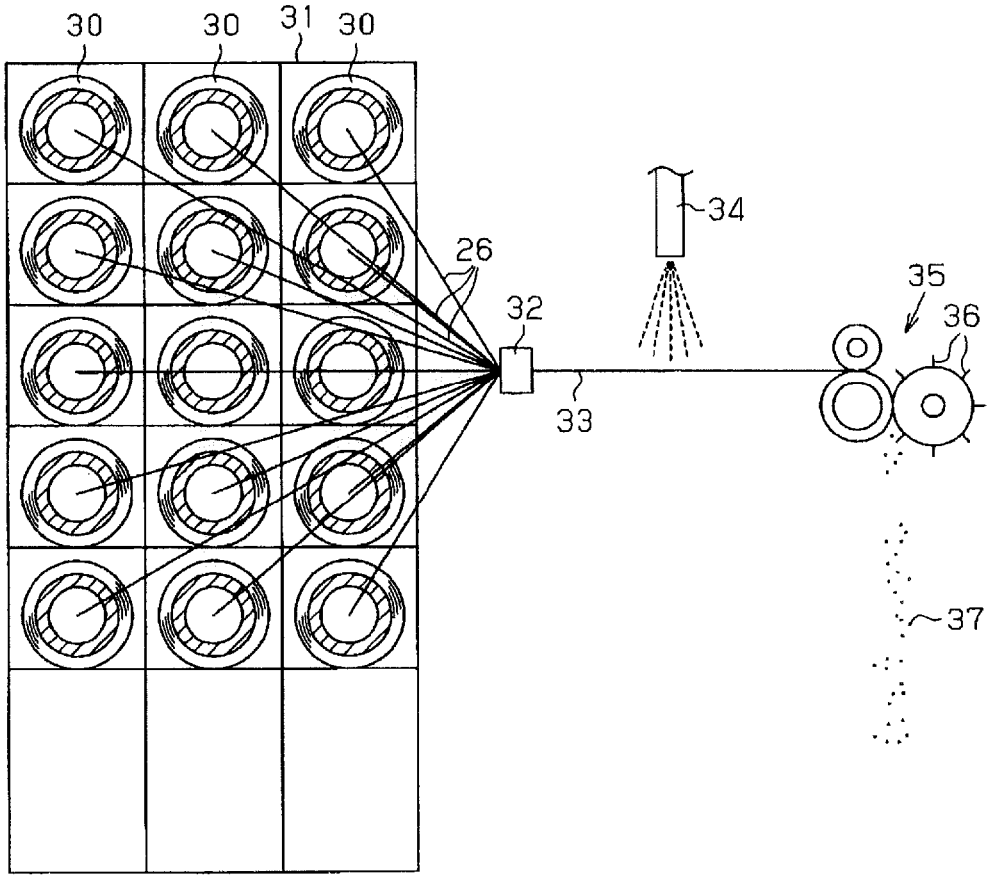
FIG. 4 is a cross-sectional view partially showing an example of an apparatus for producing chopped strands.

Next, as shown in FIG. 4, the cakes 30 are placed in a creel 31, and the strands 26 are drawn out from the cakes 30 and bundled into a strand bundle 33 through a bundle guide 32. The strand bundle 33 is sprayed with water or a treatment liquid by a spraying apparatus 34. The strand bundle 33 is cut by rotating blades 36 of a cutting apparatus 35, and thus chopped strands 37 are obtained.

A milled fiber has a shape obtained by cutting a glass fiber into a powder. The milled fiber has a fiber diameter of, for example, 1 to 50 μm and has an aspect ratio of, for example, 2 to 500. The aspect ratio of the milled fiber can be determined by dividing the fiber length by the fiber diameter. The milled fiber can be obtained by a known method.

A glass powder is powdery glass, and is produced by crushing glass. The average particle diameter of the glass powder is, for example, 1 to 500 μm. The particle diameter of the glass powder is defined as the diameter of a sphere having the same volume as a particle of the glass powder. The glass powder can be obtained by a known method.

A glass bead has a spherical shape or a substantially spherical shape. The average particle diameter of the glass bead is, for example, 1 to 500 μm. The particle diameter of the glass bead is defined as the diameter of a sphere having the same volume as a particle of the glass bead. The glass bead can be obtained by a known method.

Figure 5:
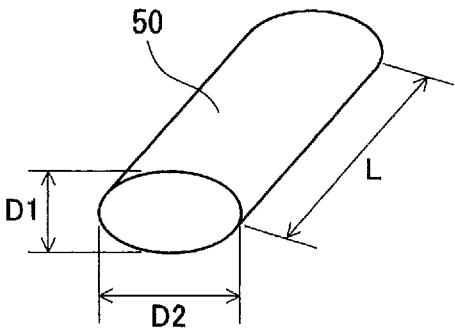
FIG. 5 is a perspective view showing an example of a flat fiber.
Figure 6:
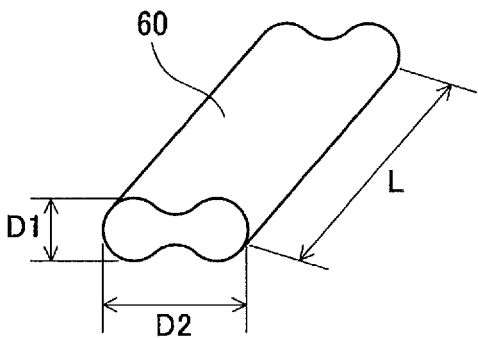
FIG. 6 is a perspective view showing another example of a flat fiber.

A flat fiber has a shape obtained by cutting a glass fiber having a cross section with a flat shape such as an ellipse. As shown in FIG. 5, a major axis D2 is larger than a minor axis D1 in the cross section of the flat fiber, and D2/D1 is, for example, 1.2 or more. The minor axis D1 is, for example, 0.5 to 25 μm. The major axis D2 is, for example, 0.6 to 300 μm. A length L of the flat fiber is, for example, 10 to 1000 μm. The flat fiber can be obtained by a known method. As shown in FIG. 6, the cross-sectional shape of the flat fiber may have a recessed shape in which a surface extending along the major axis D2 recedes in a central portion compared to end portions.

A flaky glass is a thin glass flake. The flaky glass may be formed of, for example, a glass flake having an average thickness of 0.1 to 2.0 μm, or may contain, for example, a glass flake having a thickness of 0.01 to 2.0 μm in an amount of 90 mass % or more. The flaky glass having such a small average thickness and having a small variation in thickness exhibits a high effect of reinforcing resins and also exhibits an excellent effect of reducing the mold shrinkage factor of resins.

The flaky glass is suitable also for alleviating the limitation on, for example, the thickness of a resin shaped body more than before. The flaky glass is formed of a glass flake having an average thickness of preferably 0.1 to 1.0 μm. The flaky glass contains a glass flake having a thickness of preferably 0.05 to 1.0 μm in an amount of 90 mass % or more. The flaky glass can be obtained by the above-described method.

(Granulation of Glass Filler)

At least a portion of the glass filler may be granulated. Granulation is a process in which a glass filler is subjected to a binder treatment such that individual glass fillers are bonded to each other by a binder to be granulated. Granular glass fillers hardly scatter and accordingly are excellent in workability, and are also excellent in dispersibility in resins. The use of granular glass fillers improves the feeding efficiency, thereby allowing more reliable quantitative feeding. The binder for use in granulation will be described below.

The binder preferably contains a surfactant and a binding component. The surfactant may be either anionic, cationic, amphoteric, or nonionic. However, in the case where the binding component contains an epoxy resin or a urethane resin, the use of a nonionic surfactant is preferred. This is because agglomeration of the binder can be reduced for stabilization. Examples of an anionic surfactant include dioctyl sodium sulfosuccinate, fatty acid salt, alkyl sulfate, alkyl sulfonate, alkyl aryl sulfonate, alkyl naphthalene sulfonate, alkyl sulfosuccinate, alkyl diphenyl ether disulfonate, alkyl phosphate, polyoxyethylene alkyl sulfate, polyoxyethylene alkyl allyl sulfate, and sulfosuccinate. Examples of a cationic surfactant include higher amine halogen acid salt, alkyl pyridinium halide, and quaternary ammonium salt. Examples of an amphoteric surfactant include lauryl amino propionate and lauryl dimethyl betaine. Examples of a nonionic surfactant include: polyoxyethylene glycol alkyl ethers such as polyoxyethylene lauryl ether, polyoxyethylene higher alcohol ether, and polyoxyethylene octyl phenyl ether; polyethylene glycol fatty acid esters such as polyethylene glycol monostearate; sorbitan fatty acid esters such as sorbitan monolaurate and polyoxyethylene sorbitan monolaurate; glycol fatty acid esters such as glycol monostearate; and fatty acid monoglycerides. Two or more of these may be used in combination.

The binding component of the binder is not particularly limited, and an organic or inorganic component can be used. Examples of the organic binding component include methylcellulose, carboxymethyl cellulose, starch, carboxymethyl starch, hydroxyethyl cellulose, hydroxypropyl cellulose, polyvinyl alcohol, silane coupling agents, acrylic resins, epoxy resins, phenolic resins, vinyl acetate, and urethane resins. Examples of the inorganic binding component include liquid glass, colloidal silica, colloidal alumina, and amino silane. The binding component preferably contains at least one selected from silane coupling agents, epoxy resins, and urethane resins. The silane coupling agents have two or more types of reactive groups in a molecule, one of which reacts with the surface of a glass flake, and another one of which reacts with an organic binding component and a thermoplastic resin. Accordingly, the affinity between the glass flake and the thermoplastic resin is improved. Epoxy resins and urethane resins have a good affinity for silane coupling agents and thermoplastic resins.

The concentration of the binder is preferably adjusted using water or an alcohol as a solvent such that the respective components can be uniformly present on the surface of a glass filler. The concentration of the binder is preferably 1 to 10 mass % in terms of total solid concentration. The binder can be produced by, for example, appropriately adding a binding component, a surfactant, and the like to a solvent at ordinary temperature and atmospheric pressure and stirring the resultant solution to homogeneity.

The ratio of the binder, in other words, the deposit ratio of the binder, in the granulated glass filler is, for example, 0.1 to 2 mass % in terms of solid content mass ratio. A deposit ratio of 0.1 mass % or more is suitable for sufficiently reducing scattering of the glass filler. A deposit ratio of 2 mass % or less is suitable for reducing gas generation and thus discoloration of a resin-containing composition at extrusion molding of the resin-containing composition.

The method for granulating the glass filler is not particularly limited, and for example, stirring granulation, fluidized bed granulation, injection granulation, or rotary granulation can be used. Specifically, according to an applicable method, glass fillers onto which an appropriate amount of the binder is deposited with a spray or the like are spread in a rotating drum or on a vibrating tray, and the glass fillers are granulated while being heated to evaporate a solvent. By appropriately adjusting the rotational rate of the rotating drum or the vibration frequency of the vibration tray, and even the evaporation rate of the solvent, granular glass fillers having a desired size can be produced.

The glass filler may have a surface subjected to a surface treatment with a surface treatment agent. This treatment may improve the reinforcing effect of the glass filler. Examples of the surface treatment agent include silicon coupling agents such as γ-aminopropyltriethoxysilane, vinyltriethoxysilane, and γ-methacryloxypropyltrimethoxysilane, and titanium coupling agents. The use amount of the surface treatment agent is, for example, 0.05 to 0.20 mass % of the glass filler.

[Method for Producing Glass Filler]

A method for producing the glass filler of the present embodiment includes a step of producing a glass filler precursor and a step of eluting at least partially a base glass composition from the glass filler precursor.

(Step of Producing Glass Filler Precursor)

In this step, the glass filler precursor is produced. The glass filler precursor can be produced by applying a known method according to the type of the glass filler. The glass filler precursor is produced usually by melting a glass raw material and forming the molten glass raw material into a predetermined shape. The base glass composition contained in the glass filler precursor is not particularly limited as long as a glass filler having an intended glass composition is obtained in the end. An example of a preferred base glass composition is as follows.

The preferred base glass composition contains, for example, the following components:

$52 \leq SiO_2 \leq 57$;
$5 \leq B_2O_3 \leq 12$;
$12 \leq Al_2O_3 \leq 17$;
$0 \leq R_2O \leq 3$;
$15 \leq RO \leq 30$;
$0 \leq TiO_2 \leq 3$; and
$0 \leq T\text{-}Fe_2O_3 \leq 1$ (Step of Eluting Base Glass Composition)

In this step, the base glass composition is at least partially eluted from the glass filler precursor, and the glass filler is thus produced. As a result of the elution, the glass filler contains a glass composition differing in composition from the base glass composition. In this eluting step, the $SiO_2$ content in the glass filler is relatively high. In other words, the $SiO_2$ content on a weight basis in the glass composition included in the glass filler is higher than the $SiO_2$ content on a weight basis in the base glass composition.

The eluting step can be performed, for example, by bring the glass filler precursor into contact with an acidic solution. As the acidic solution, an inorganic acid can be used such as hydrochloric acid, nitric acid, or sulfuric acid, in addition to an organic acid. A preferred acidic solution is an inorganic acid, specifically hydrochloric acid and/or nitric acid, particularly hydrochloric acid. Hydrochloric acid may be used, for example, at a concentration of 1 to 6 normality (1 to 6 N).

The contact between the glass filler precursor and the acidic solution is not limited to a particular form, either, and can be performed, for example, by immersing the glass filler precursor in the acidic solution which is held in a container. The acidic solution, which is to be brought into contact with the glass filler precursor, is preferably heated. A preferred temperature of the acidic solution is 40 to 90° C., particularly 70 to 90° C. The time for contact between the glass filler precursor and the acidic solution is not particularly limited, and is for example 1 to 48 hours though depending on the concentration, temperature, etc. of the acidic solution.

Although depending on the base glass composition, 30 to 60%, particularly 40 to 50% on a weight basis of the glass filler precursor may be eluted in the eluting step. To sufficiently decrease the permittivity, it is desirable that a significant amount of components other than $SiO_2$ should be eluted preferentially to sufficiently increase the $SiO_2$ content.

After the eluting step, a drying step is performed as necessary to remove moisture and an acid component from the glass filler. The drying step can be performed by heating the glass filler to a temperature range of 50 to 200° C., preferably 80 to 180° C. More preferably, after the eluting step, a firing step is performed subsequently to the optional drying step. The firing step is not particularly limited, and is preferably a heating step at 100° C. or more for 15 minutes to 12 hours, more preferably a heating step at 1000 to 1300° C. for 15 minutes to 12 hours, and even more preferably a heating step at 1150 to 1200° C. for 30 minutes to 4 hours. In the case where the heating step is excessively low in temperature or excessively short in time, there is a case that the surface roughness of the glass filler is high, for example, that the specific surface area exceeds 2.0 m$^2$/g or the pore volume exceeds 5.0×10$^{-2}$ cm$^3$/g. In contrast, in the case where the heating step is excessively high in temperature, the glass filler becomes deformed, or the glass fillers become fused together in extreme cases, in the heating step.

[Glass Cloth]

The above-described glass composition of the glass filler according to the present embodiment is suitable also for use as a glass cloth. In addition, the above-described properties of the glass filler according to the present embodiment are desirable ones also as the properties of the glass cloth. In another aspect, the present invention provides a glass cloth having the above-described glass composition and/or the above-described properties, and further provides a continuous glass fiber having the above-described glass composition and/or the above-described properties. The above-described prior art on glass cloths fails to make a sufficient study on the components and properties.

The glass composition constituting the glass cloth according to the present invention is as described above. In a preferred embodiment, the glass composition may be substantially free of B$_2$O$_3$. The glass composition may be substantially free of R$_2$O. The glass composition may contain a minute amount (for example 0.01% or more) of TiO$_2$. The various properties of the glass cloth according to the present invention are as described above. In the glass cloth according to the present invention, the permittivity at a frequency of 1 GHz may be less than 4. Further, the specific surface area may be adjusted to 2.0 m$^2$/g or less. The pore volume may be adjusted to 5.0×10$^{-2}$ cm$^3$/g or less. The same applies to the continuous glass fiber according to the present invention.

The glass cloth and the continuous glass fiber according to the present invention can be produced in accordance with the above-described method for producing the glass filler. For example, the glass cloth is produced as follows. First, the continuous glass fiber is produced through an eluting step in which a base glass composition is at least partially eluted from a continuous glass fiber precursor. After this eluting step, a drying step and a heating step are appropriately performed as described above. Then, with use of the obtained continuous glass fiber, the glass cloth is produced by a known method. Note that the eluting step may be performed on a glass cloth precursor formed in advance using the continuous glass fiber.

[Glass Mat]

The glass filler according to the present invention may also be used in the form of a glass mat. The glass cloth is a woven fabric, whereas the glass mat is a non-woven fabric. The glass mat typically contains a chopped strand, and may contain the glass filler having other shape. The glass mat may contain a binder together with the glass filler. The glass mat may contain a resin or other short fiber.

[Resin-Containing Composition]

The resin-containing composition according to the present invention contains a resin together with the glass filler according to the present invention. The resin may be a thermoplastic resin or a thermosetting resin. The thermoplastic resin is not particularly limited, and is, for example, polyvinyl chloride, polypropylene, polyethylene, polystyrene, polyester, polyamide, polycarbonate, polybutylene, polybutylene terephthalate, or a copolymer of these. The use of polybutylene terephthalate exhibits a significant effect on improvement of reduction in warpage of a molded article caused by mixing with glass fillers and improvement of dimensional stability. The thermosetting resin is not particularly limited, and is phenol resin, epoxy resin, melamine resin, urea resin, unsaturated polyester resin, alkyd resin, polyurethane, polyimide, or the like.

The resin-containing composition according to the present invention is not particularly limited, and may be, for example, one called a sheet molding compound, a bulk molding compound, or the like. In the resin-containing composition, the glass filler according to the present invention may be contained in a state where the glass fillers are interspersed or in a state where the glass filler constitutes a shaped body such as a glass mat.

The content of the glass fillers such as glass flakes in the resin-containing composition is preferably 5 to 70 mass %. Setting the content to 5 mass % or more facilitates the glass fillers to sufficiently exhibit their function as a reinforcement. Setting the content to 70 wt % or less facilitates the glass fillers to be uniformly dispersed in the resin-containing composition. To sufficiently reduce the mold shrinkage factor, the content of the glass fillers is more preferably 30 mass % or more.

The resin-containing composition may appropriately contain a reinforcement other than the glass fillers. For example, in applications requiring a high strength, continuous glass fibers may be contained. In this case, the continuous glass fibers may be added at a content nearly equal to that of the glass fillers.

Glass flakes, flat fibers, and flaky glasses have relatively large specific surface areas, and are suitable for achieving the adhesive force with thermoplastic resins. From this viewpoint, the flat fiber shown in FIG. 6 is preferable owing to its recessed surface shape contributing to an increase in specific surface area.

Another form of the resin-containing composition according to the present invention contains a resin together with the glass cloth according to the present invention. An example of this form is a prepreg. Also in this form, the resins described above can be used.

The resin-containing composition according to the present invention has a low permittivity, and is suitable for improvement in various properties such as improvement in strength, heat resistance, and dimensional stability, decrease in linear thermal expansion coefficient and reduction in its anisotropy, and reduction in anisotropy of the shrinkage factor at molding. The resin-containing composition according to the present invention is shaped into a shaped body having a shape suitable for applications, as necessary. The resin-containing composition according to the present invention, taking advantage of its low dielectric properties, is used, for example, in communication equipment and its peripheral members.

EXAMPLES

Hereinafter, the present invention will be described in more detail by Examples. The present invention is not limited to the following Examples.

Example 1

First, a flake-like glass shaped body was produced with the apparatus shown in FIG. 2, and furthermore was classified to produce a glass filler precursor. The glass raw material was prepared such that the resulting precursor had the composition of 53.5% of $SiO_2$, 8.5% of $B_2O_3$, 15% of $Al_2O_3$, 0.2% of $Na_2O$, 0.2% of $K_2O$, 4.5% of MgO, 17.5% of CaO, 0.4% of $TiO_2$, and 0.2% of $T\text{-}Fe_2O_3$. Next, the glass filler precursor was immersed for 6 hours in a 9% hydrochloric acid heated to 82° C., and then was thoroughly washed with deionized water. Furthermore, the glass filler precursor was held for drying in a hot air circulating electric drying chamber at 180° C. for 6 hours. Then, the glass filler precursor was further transferred into an electric furnace set at 1150° C. and was held therein for heating for 8 hours. A glass flake obtained after the acid treatment and heating had the composition shown in Table 1, and its weight reduced by 45.7% compared with that before the acid treatment.

Example 2

A glass flake was obtained in the similar manner as in Example 1 except that the base glass composition was set to 53.2% of $SiO_2$, 9% of $B_2O_3$, 14.6% of $Al_2O_3$, 0.6% of $Li_2O$, 0.6% of $Na_2O$, 0.2% of $K_2O$, 0.5% of MgO, 21.1% of CaO, and 0.2% of $T\text{-}Fe_2O_3$. The glass flake had the composition shown in Table 1, and its weight reduced by 46.3% compared with that before the acid treatment.

Example 3

A glass flake was obtained in the similar manner as in Example 1 except that the base glass composition was set to 53% of $SiO_2$, 8% of $B_2O_3$, 14% of $Al_2O_3$, 4% of MgO, 20% of CaO, 0.6% of $TiO_2$, and 0.4% of $T\text{-}Fe_2O_3$. The glass flake had the composition shown in Table 1, and its weight reduced by 45.9% compared with that before the acid treatment.

Comparative Example 1

The glass flake before the acid treatment, which has been prepared in Example 1, was used as a glass filler without further treatment.

Comparative Example 2

A commercially available glass fiber having the D-glass composition was used as a glass filler without any treatment.
(Average Thickness and Average Particle Size)
The glass flakes of Examples 1 to 3 were measured with a laser microscope (available from Lasertec Corporation, product name: OPTELICS HYBRID). Specifically, the particle size of a glass flake is determined by arithmetically averaging the maximum diameter of the glass flake when observed from above its principal surface and the diameter of the glass flake in a direction perpendicular to the maximum diameter inside the principal surface. The particle sizes of 50 different glass flakes are arithmetically averaged to determine the average particle size. In addition, the average thickness was determined by arithmetically averaging the thicknesses of 50 different glass flakes when observed from their thickness directions. The similar measurement was performed on the glass flakes before the acid treatment of Examples 1 to 3 as well. The measured values are shown in Table 1.
(Permittivity and Dielectric Loss Tangent)
The permittivity (dielectric constant) and the dielectric loss tangent at the respective frequencies were measured using a permittivity measuring apparatus by a cavity resonator perturbation method. The measurement temperature was set to 25° C., and the dimensions of a sample for measurement were set to a rectangular parallelepiped with a length of 10 cm having a square bottom surface of side 1.5 cm. This sample was formed into the above rectangular parallelepiped shape by placing a glass filler into a mold and pressing it with a hydraulic press. This sample has pores, and its measured value does not directly indicate the proper value of the glass filler. However, the proper value of the glass filler was calculated by conversion assuming that a pore portion is air. The proper density of the glass filler was measured by the Archimedes' method in which kerosene is used as an immersion liquid. The apparent density of the sample was determined by dividing its weight by its volume which is measured with a micrometer or a caliper and is calculated. The porosity of the sample was determined from these values, and the proper value of the glass filler was calculated assuming that the volume corresponding to the porosity was air. The measured values of the permittivity and dielectric loss tangent are shown in Table 1.
(Arithmetic Average Roughness)
The arithmetic average roughness Ra, specified JIS B 0601-2001, with respect to the principal surface of the glass flake of Example 1 was evaluated as 0.01 μm. The glass flake of Example 1 had a surface as smooth as the fire-finished surface of Comparative Example 1 (the glass filler precursor before the acid treatment of Example 1).
(Specific Surface Area, Etc.)
The specific surface area, the pore volume, and the porosity were measured by the BET method (nitrogen adsorption method) with respect to Comparative Example 1 (the glass filler precursor before the acid treatment of Example 1), Reference Example 1 (the glass filler precursor with the acid treatment and with no heat treatment after drying in Example 1), and the glass flake of Example 1. The average pore diameter was calculated with respect to Reference Example 1. The results are shown in Table 2.

TABLE 1

| | Example 1 | Example 2 | Example 3 | Comparative Example 1 | Comparative Example 2 |
|---|---|---|---|---|---|
| | Glass composition (wt %) | | | | |
| $SiO_2$ | 98.4 | 99.0 | 98.0 | 53.5 | 72 |
| $B_2O_3$ | 0 | 0 | 0 | 8.5 | 23 |
| $Al_2O_3$ | 0.4 | 0.4 | 0.4 | 15.0 | 1 |
| $Li_2O$ | 0 | 0 | 0 | 0 | 0 |
| $Na_2O$ | 0 | 0 | 0 | 0.2 | 2.5 |
| $K_2O$ | 0 | 0 | 0 | 0.2 | |
| MgO | 0.1 | 0 | 0.1 | 4.5 | 0 |
| CaO | 0.4 | 0.6 | 0.5 | 17.5 | 1 |
| $TiO_2$ | 0.7 | 0 | 1.0 | 0.4 | 0 |
| $T\text{-}Fe_2O_3$ | 0 | 0 | 0 | 0.2 | 0 |
| Average thickness before acid treatment (μm) | 5 | 1.3 | 0.7 | 5 | — |
| Average particle size before acid treatment (μm) | 240 | 160 | 160 | 240 | — |
| Average thickness after acid treatment and heating (μm) | 5 | 1.3 | 0.7 | — | — |

TABLE 1-continued

| | Example 1 | Example 2 | Example 3 | Comparative Example 1 | Comparative Example 2 |
|---|---|---|---|---|---|
| Average particle size after acid treatment and heating (μm) | 160 | 70 | 50 | — | — |
| Permittivity (1 GHz) | 3.8 | 3.8 | 3.8 | 6.6 | 4.0 |
| Dielectric loss tangent (1 GHz: ×10⁻⁴) | 5 | 5 | 5 | 12 | 10 |

TABLE 2

| | Comparative Example 1 | Reference Example 1 | Example 1 |
|---|---|---|---|
| Specific surface area (m²/g) | 0.07 | 400 | 0.24 |
| Average pore diameter (nm) | — | 2.27 | — |
| Pore volume (cm³/g) | $3.54 \times 10^{-4}$ | $2.27 \times 10^{-1}$ | $1.01 \times 10^{-3}$ |
| Porosity (%) | 0 | 32 | 0 |

The invention claimed is:

1. A glass filler comprising a glass composition, wherein the glass composition comprises, in wt %:
$95 \leq SiO_2 \leq 99.5$;
$0 \leq B_2O_3 \leq 2$;
$0.01 \leq Al_2O_3 \leq 4$;
$0 \leq R_2O \leq 4$;
$0.2 \leq RO \leq 1.5$; and
$0.1 \leq TiO_2 \leq 2$,
where RO is at least one compound selected from the group consisting of MgO, CaO, SrO, and ZnO, and $R_2O$ is at least one compound selected from the group consisting of $Li_2O$, $Na_2O$, and $K_2O$.

2. The glass filler according to claim 1, wherein the glass composition comprises, in wt %:
$95 \leq SiO_2 \leq 99$;
$0 \leq B_2O_3 \leq 2$;
$0.01 \leq Al_2O_3 \leq 2$;
$0 \leq R_2O \leq 2$;
$0.2 \leq RO \leq 1.5$; and
$0.1 \leq TiO_2 \leq 2$.

3. The glass filler according to claim 1, wherein the glass composition is substantially free of $T\text{-}Fe_2O_3$, where the $T\text{-}Fe_2O_3$ represents total iron oxide calculated as $Fe_2O_3$.

4. The glass filler according to claim 1, wherein the glass composition is substantially free of $R_2O$.

5. The glass filler according to claim 1, wherein the glass composition comprises, in wt %,
$95 \leq SiO_2 \leq 99$;
$0 \leq B_2O_3 \leq 2$;
$0.01 \leq Al_2O_3 \leq 4$;
$0.4 \leq R_2O \leq 2$;
$0.2 \leq RO \leq 1.5$; and
$0.1 \leq TiO_2 \leq 2$.

6. The glass filler according to claim 1, wherein the glass composition comprises, in wt %,
$0.25 \leq TiO_2 \leq 2$.

7. The glass filler according to claim 1, wherein the glass composition comprises, in wt %,
$97.5 \leq SiO_2 \leq 99$.

8. The glass filler according to claim 1, wherein the glass composition comprises, in wt %,
$0.2 \leq Al_2O_3 \leq 0.6$.

9. The glass filler according to claim 1, wherein the glass composition comprises, in wt %:
$0.05 \leq MgO \leq 0.5$; and
$0.1 \leq CaO \leq 1$.

10. The glass filler according to claim 1, having a permittivity of less than 4 at a frequency of 1 GHz.

11. The glass filler according to claim 1, having a surface roughness Ra of 0 to 100 nm.

12. The glass filler according to claim 1, having a specific surface area of 0.03 to 10 m²/g.

13. The glass filler according to claim 1, having a pore volume of 0 to 0.1 cm³/g.

14. The glass filler according to claim 1, wherein the form of the glass filler is at least one selected from the group consisting of a glass flake, a chopped strand, a milled fiber, a glass powder, a glass bead, and a flat fiber.

15. A resin-containing composition comprising:
the glass filler according to claim 1; and
a resin.

16. A method for producing the glass filler according to claim 1, the method comprising:
producing a glass filler precursor including a base glass composition; and
eluting at least partially the base glass composition from the glass filler precursor a so as to obtain the glass filler, which has a glass composition differing in composition from a glass composition of the base glass composition.

17. The method according to claim 16, further comprising heat treating after the eluting, wherein
in the heat treating, a heat treatment at 1000° C. or higher is performed.

18. The method according to claim 16, wherein
a $SiO_2$ content on a weight basis in the glass composition included in the glass filler is higher than a $SiO_2$ content on a weight basis in the base glass composition.

* * * * *